(12) United States Patent
Macquart et al.

(10) Patent No.: US 6,490,839 B1
(45) Date of Patent: Dec. 10, 2002

(54) WINDOW FRAME AND METHOD OF PRODUCING IT

(75) Inventors: Philippe Macquart, Anieres (FR); Remi Carel, Lyons (FR)

(73) Assignee: Lapeyre, Aubervilliers (FR)

( * ) Notice: Subject to any disclaimer, the term of this patent is extended or adjusted under 35 U.S.C. 154(b) by 0 days.

(21) Appl. No.: 09/502,456

(22) Filed: Feb. 11, 2000

(30) Foreign Application Priority Data

Feb. 11, 1999 (FR) .............................. 99 01605

(51) Int. Cl.⁷ ................................ E04C 2/38
(52) U.S. Cl. ............... 52/656.5; 156/308.4; 156/309.6; 156/304.5; 156/304.6; 228/163
(58) Field of Search ............................ 52/656.1, 656.2, 52/656.5; 49/504; 228/163; 156/308.2, 308.4, 309.6, 304.1, 304.5, 304.6, 295

(56) References Cited

U.S. PATENT DOCUMENTS

| 4,239,574 A | * | 12/1980 | Aust et al. | 156/267 |
|---|---|---|---|---|
| 5,105,581 A | * | 4/1992 | Slocomb | 49/504 |
| 5,406,768 A | * | 4/1995 | Giuseppe et al. | 52/730.4 |
| 5,497,594 A | * | 3/1996 | Giuseppe et al. | 52/730.4 |
| 6,129,805 A | * | 10/2000 | Valentin | 156/304.2 |

FOREIGN PATENT DOCUMENTS

| DE | 17 79 361 | 10/1970 |
|---|---|---|
| DE | 21 13 804 | 10/1972 |
| DE | 34 05 384 | 7/1985 |
| EP | 0 698 719 | 2/1996 |
| EP | 0 900 907 | 3/1999 |

* cited by examiner

Primary Examiner—Jerry Redman
(74) Attorney, Agent, or Firm—Oblon, Spivak, McClelland, Maier & Neustadt, P.C.

(57) ABSTRACT

A window frame is formed of a plurality of plastic section pieces welded together at their ends. The ends of the plastic section pieces also have surfaces which abut one another. The plastic section pieces are not welded at the abutting surfaces. The unwelded abutting surfaces can therefore be used to define the length of the window frame.

9 Claims, 3 Drawing Sheets

WINDOW FRAME AND METHOD OF PRODUCING IT

BACKGROUND OF THE INVENTION

1. Field of the Invention

The invention relates to a method for producing a window frame consisting essentially of plastic section pieces welded together.

The invention also relates to a window frame obtained using said production method.

2. Description of the Related Art

First of all, the expression "window frame" is understood as meaning the fixed or opening frame of a window or a window jamb.

In general, a window comprises at least one pane of glass assembled with a mobile or non-mobile bearing frame hung on a jamb which is fixed into the stonework.

Conventionally, the window frame consists of a number of section pieces joined together in such a way as either to surround the opening made for this purpose in the stonework or to take a pane of glass, the section pieces therefore exhibiting a housing designed for this purpose and known as the glazing rebate.

When the window frame is made of plastic such as, for example, polyvinyl chloride (PVC), the section pieces are generally joined together by thermal welding at the corners of said frame. This assembly takes place by melting the plastic of each section plane over a few millimeters before clamping the section pieces together to obtain a weld. The clamping compresses the molten parts and causes a bead of material to form in the region of the join, this bead of material protruding from the visible surfaces of the frame. The welded parts then have to be deburred in order to eliminate the unattractive surplus material.

This method, although commonly employed, has a certain number of drawbacks which it would be desirable to alleviate, at least in part.

First of all, the result of such a method is that the desired final dimensions of the welded frame are not precisely achieved and generally vary by plus or minus 1 mm.

Thus, when, for example, the glazing is immobilized in the frame by attached glazing beads which are fixed to the frame by clipping or any other means of attachment known to those skilled in the art, each glazing bead has to be cut to the precise dimension observed after welding so that it fits perfectly in the frame.

In consequence, a product such as this generates a great many operations and involves a great deal of labor for implementing it.

What is more, it entails the carrying of a large stock of parts for making the frame and entails very precise management.

What is more, the removal of surplus material from the regions of the joints involves a lot of material in addition to the corresponding process time, and this further affects the profitability of the method.

SUMMARY OF THE INVENTION

The object of the present invention is to improve this type of manufacture.

The subject of the invention is therefore a novel method for producing window frames consisting essentially of plastic section pieces welded together which is easy to implement, which reduces the number of operations, and which makes stock management easier.

The invention proposes a method for producing a window frame consisting essentially of plastic section pieces welded together, such that the section pieces are cut so that at least part of the section of said section pieces determines the required length of the section pieces, and then the section pieces are thermally welded together, avoiding welding those parts of the sections of the section pieces that determine the required length of the section pieces.

The term "required length" is to be understood as meaning the length of the section pieces, determined to within one millimeter, so as to produce the frame once the section pieces have been assembled.

As a preference, those parts of the sections of the section pieces that determine the required length of the section pieces act as limit stops during assembly by thermal welding.

Thus, having melted part of the ends of the section pieces, the clamping of the section pieces is blocked in its travel by the unwelded parts of the section pieces, and the assembling of the section pieces makes it possible to obtain a frame, the dimensions of which are precisely predetermined. Thus, any prefabricated additional component can be fitted without the need to measure the dimensions of the assembled frame after assembly in order to adjust the dimensions of the additional part.

According to a preferred embodiment of the invention, the section pieces are cut while at the same time making at least one offset on the lateral sides of said section pieces, said offset determining the required length of said section pieces.

Thus, at the time of assembly, the lateral sides of the section pieces come edge to edge without being welded together, and the appearance of surplus material that needs to be eliminated is avoided.

According to another embodiment of the invention, the section pieces have at least one glazing bead integral with said section pieces and movable, and the section pieces are cut while at the same time making at least one offset at the glazing bead, said offset determining the required length of said section pieces.

Thus, the section pieces are joined together up to the point where the glazing beads come edge to edge. The frame obtained thus has the predetermined dimensions, the glazing beads determining the required length.

According to another alternative form of the invention, the section pieces are cut while at the same time making at least one offset in the region where a seal is to be positioned, said offset determining the required length of said section pieces.

The section pieces may be fitted with the seal after they have been assembled into the form of a frame, or alternatively before assembly, the seal possibly being coextruded onto the section piece at the time of the manufacture of the latter.

As a preference, the seal is a seal extruded separately (extruded "by the kilometer"), that is cut to the required length of the section piece before being fitted on the section piece in the positioning region designed for this purpose, aligning the ends of the seals with the offsets in said region.

In this alternative form, assembly is performed while avoiding the welding of the section pieces in the region in which the seal is positioned.

Thus, when assembling the section pieces, the welding of the seals and thus the appearance of excess material at their point of contact is avoided. All that is then required is for the free ends of the seals to be bonded together so as to seal the assembly.

According to a preferred embodiment of the invention, which is applicable to each embodiment or alternative form described hereinabove, the offset is between 1 and 3 mm.

According to one alternative form of the invention, a plastic or metal section piece is incorporated into the section pieces that form the window frame, this incorporated section piece having the required length of the section pieces so that it acts as a stop piece during assembly by thermal welding.

Another subject of the invention is a novel window frame that can be obtained from the production method described hereinabove.

The invention proposes a window frame essentially consisting of plastic section pieces welded together, such that the assembly surface of the section pieces exhibits at least one region which is not welded.

Thus, at the time of assembly, part of the section of a section piece is welded to a corresponding part of the section of a second section piece, and the remainder of the section of the section piece is simply in edge-to-edge contact with the corresponding remainder of the section of the second section piece.

According to an advantageous alternative form of the invention, the unwelded region is at least the lateral sides of said section pieces.

Thus, when the section pieces are assembled, the welded point is made in a part of the section pieces which is not exposed to view and there are no longer any regions of finish-grinding on the lateral sides, said region of finish-grinding corresponding to the deburring of the excess material resulting from the welding operation. Thus, the region of assembly is near the practically invisible region of the lateral edges.

According to a preferred alternative form of the invention, the section pieces have a double wall in the region of the lateral sides, the two walls being spaced apart, and the unwelded region is the outer wall of the double wall.

Thus, there is still one welded wall in the region of the lateral sides, which makes it possible to guarantee the leaktightness of the assembly and good overall weld strength, particularly in terms of resistance to breaking at the corners. Furthermore, the space between the two walls is able to catch the excess material that results from the welding operation, so that good edge-to-edge contact of the outer wall can be maintained, without the need for deburring.

According to an alternative form of the invention, the section pieces exhibit at least one glazing bead integral with said section pieces and mobile, and the ends of the glazing beads are not welded together.

According to an advantageous alternative form of the invention, the unwelded region of the section pieces is at least the region in which a seal is to be positioned. Thus, at the assembly surface, there is no node that corresponds to the welding together of the seals, such a node being unacceptable and having, of necessity, to be removed.

As a preference, the seals are bonded together at their ends. Thus, sealing is achieved around the entire periphery of the frame.

According to one embodiment of the invention, a plastic section piece is incorporated into the section pieces constituting the window frame, said plastic section piece having the same length as the assembled section pieces and not being welded at the time of assembly.

According to another embodiment of the invention, a metal section piece is incorporated into the section pieces constituting the window frame, said metal section piece having the same length as the assembled section pieces.

According to an advantageous alternative form of the invention, said incorporated section piece is a casement bolt.

The frame thus obtained advantageously has dimensions which are predetermine to within one millimeter, is easy to implement and simplifies the production method.

BRIEF DESCRIPTION OF THE DRAWINGS

Other details and advantageous features will become apparent from the description of some embodiments of a window frame according to the invention consisting essentially of plastic section pieces welded together, which is given with reference to FIGS. 1a, 1b, 2a and 2b, which depict.

DETAILED DESCRIPTION OF THE PREFERRED EMBODIMENTS

It is first of all emphasized that, for reasons of clarity, the various elements depicted are not depicted strictly to scale in all the figures.

The window frame consists of polyvinyl chloride (PVC) section pieces 1. These section pieces 1 consist of a main section piece 2 and of two glazing beads 3 and 4 with mitered ends.

Figure 1A:
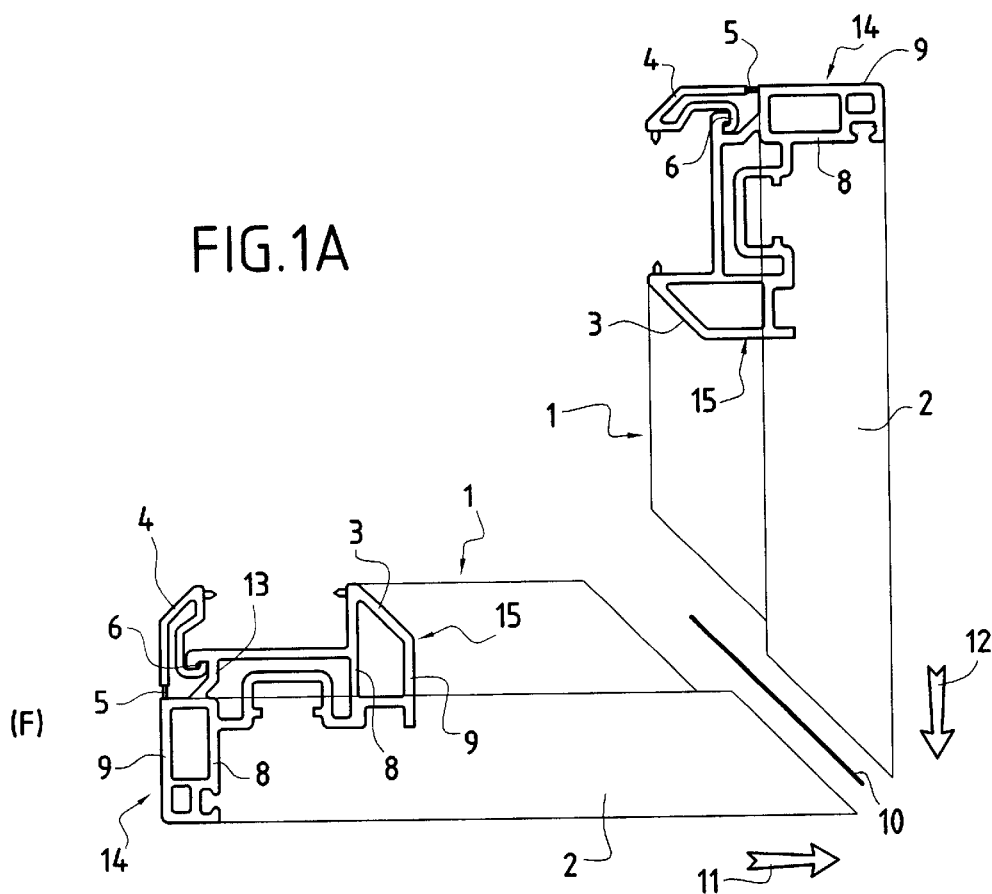
FIGS. 1a and 1b: diagrams of a first embodiment according to the invention.
Figure 1B:
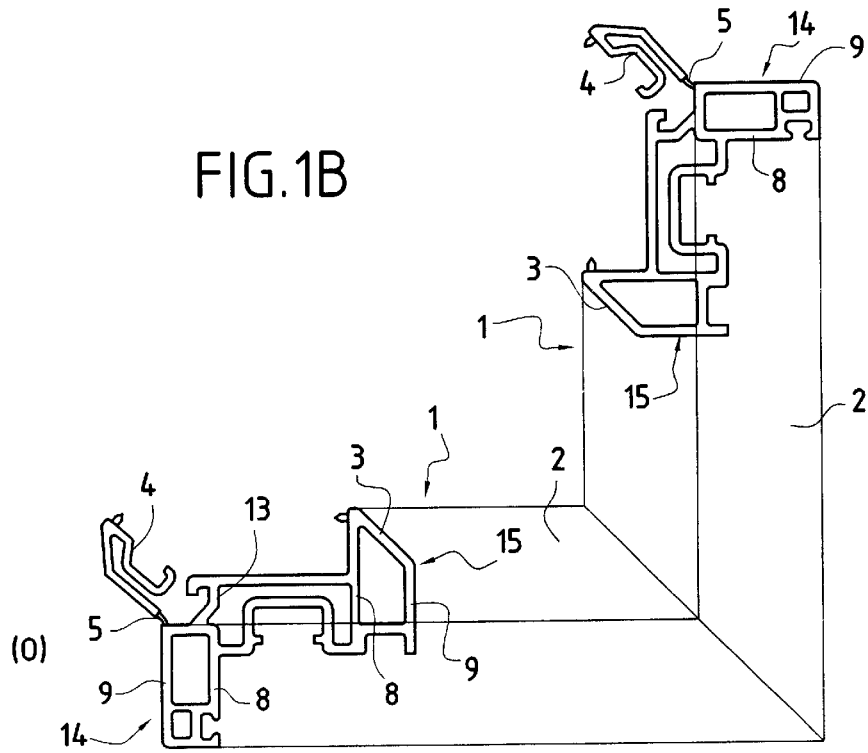

FIGS. 1a and 1b depict a first embodiment according to the invention such that the glazing beads 3 and 4 act as limit stops for the welding of the section pieces 1.

The glazing bead 3 is integral with the main section piece 2, fixedly attached thereto, whereas the glazing bead 4 is secured to the main section piece 2 by a longitudinal flexible part 5 forming a link between glazing bead and section piece. The glazing bead 4 can thus move between an open position (O) and a closed position (F) by pivoting about the axis of the flexible part 5, closure being achieved by clipping 6 to a corresponding part 7 of the main section piece 2.

This flexible part 5 may be made of a rigid polymer, particularly that of the main section piece 2, with a thin cross section allowing bending. As an alternative, the flexible part may be achieved by co-extruding a flexible material, such as plasticized PVC for example, with the material of the main section piece 2.

On each lateral side 14, 15, that is to say on each face in the plane of the frame, the main section piece has a double wall with an inner wall 8 and an outer wall 9.

In FIG. 1a, it can be seen that the section pieces 3 and 4 are drawn 3 mm shorter than the main section piece 2. The offset produced on the glazing beads 3 and 4 corresponds to the required length of the section piece 1. To perform assembly, the section pieces 1 in which the glazing beads 4 are clipped in the closed (F) position are placed in an appropriate device known to those skilled in the art, the mitered surfaces (forming assembly surfaces) of the section pieces 1 being arranged facing each other and a determined gap between them.

The heating plates 10 of the welding device are inserted into said gap so as to come into contact only with the section of the main section pieces 2, particularly the double walls 8, 9. After sufficient time to melt the plastic in the region of the assembly surfaces, the heating plates 10 will be retracted and the section pieces 1 will be clamped together in the direction of the arrows 11 and 12. This causes the molten material along the section of the main section pieces 2 to be compressed until such point as the glazing beads 3 and 4 facing each other come into abutment against each other, thus precisely determining the dimensions of the assembled frame.

In FIG. 1b, the main section pieces 2 are welded together after 3 mm of material has been melted. The glazing beads 3 and 4 which acted as limit stops during clamping are not themselves welded together and the glazing bead 4 can therefore be easily unclipped and moved into the open position (O) by pivoting about the axis of the flexible part 5 so that glazing can be introduced into the window frame thus produced.

As an alternative, the glazing bead 4 may be an element separate from the main section piece 2 and which can be clipped to the latter by means of clipping similar to that described hereinabove.

After assembly in a way similar to what has just been described, the glazing beads 3 and 4 not having been welded to their adjacent counterparts, the free glazing bead 4 of each section piece 1 can easily be unclipped to allow the frame to take the glazing.

In this first embodiment, the formation of a bead of surplus material in the region of the joint remains, but is restricted to the section of the main section pieces 2. Deburring is therefore simpler by comparison with the known method.

In spite of the fact that just part of the section of the section pieces 1 is welded, the assembly is leaktight by virtue of the fact that the interior walls 8 and the walls 13 bearing the clips 7 are welded together, creating a continuous moisture barrier inside the frame.

Figure 2A:
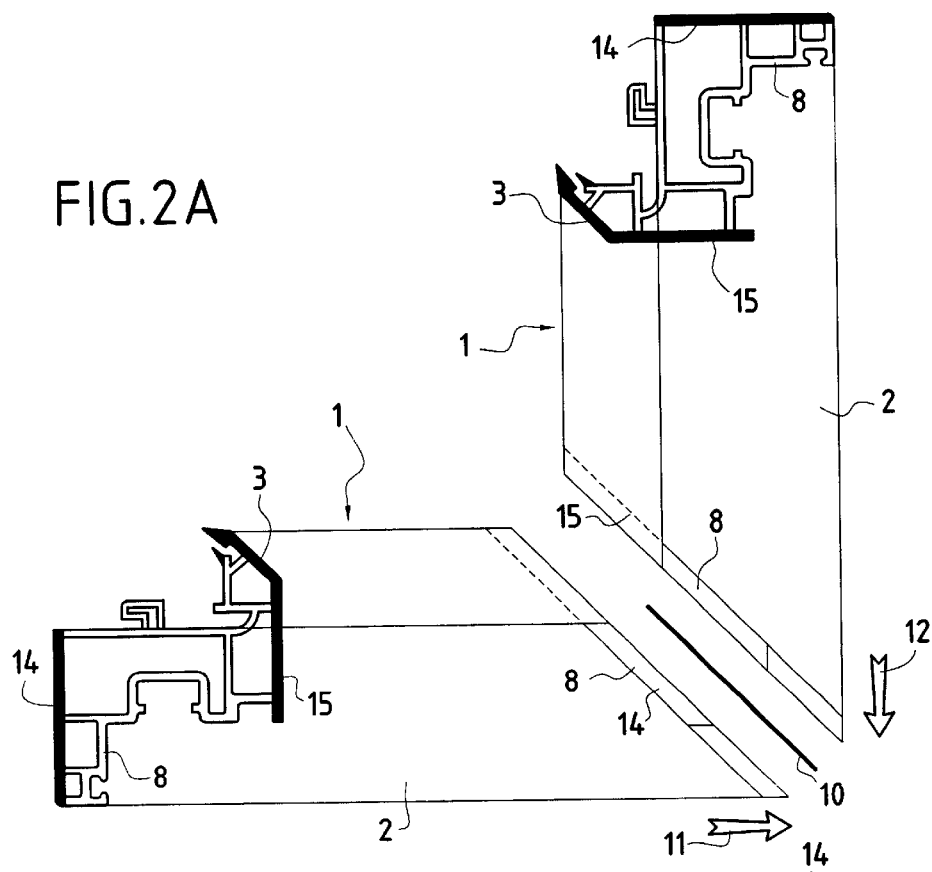
FIGS. 2a and 2b: diagrams of a second embodiment according to the invention.
Figure 2B:
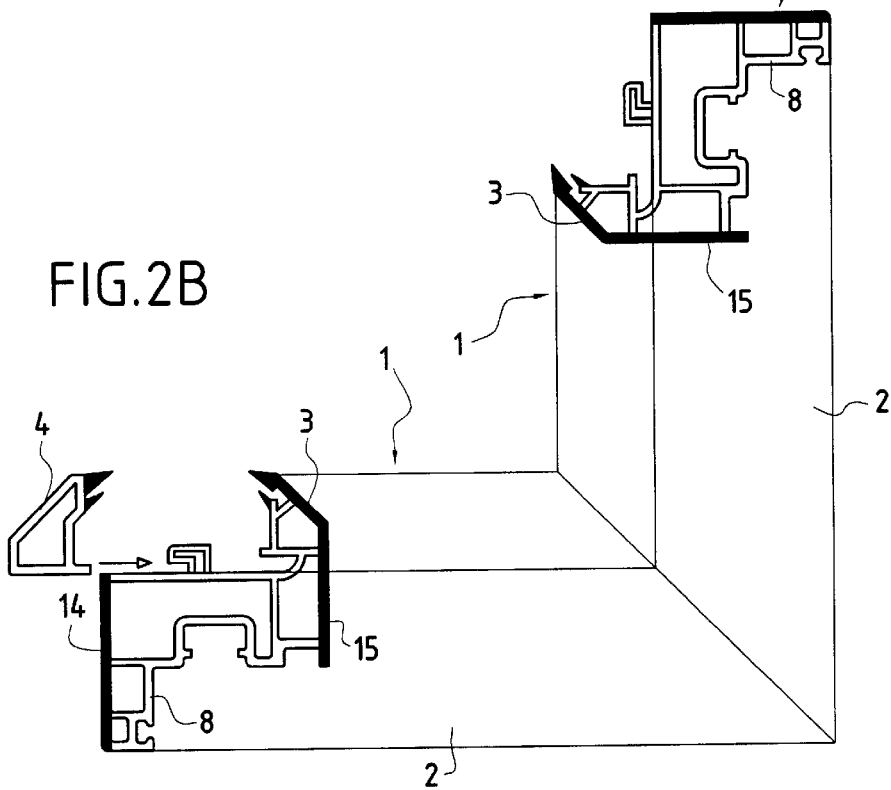

FIGS. 2a and 2b depict a second embodiment according to the invention, such that the section pieces 1 have no mobile glazing bead 4, and the lateral sides 14 and 15 of the section piece 1, which comprise the outer walls 9, act as limit stops for welding. The frame elements which are identical to those of the first embodiment bear the same reference numerals.

In FIG. 2a, it can be seen that the lateral sides 14 and 15 of the section piece 1 are drawn 3 mm shorter than the inside of the main section piece 2, particularly than the inner walls 8. The offset parts of the section of the section piece have been blackened in the side view overlaid on the diagrams of FIGS. 2a and 2b. The offset of the lateral sides 14 and 15 corresponds to the required length of the section piece 1.

For assembly, the heating plates 10 of the welding device then come only into contact with the interior section of the section pieces 1, then the section pieces 1 will be clamped together in the direction of the arrows 11 and 12, as before.

This time, the molten material is compressed only on the interior section of the section pieces, so that the surplus material which ordinarily would form a bead on the surface of the frame, is now contained within the section pieces 1.

When the lateral sides 14 and 15 facing each other come into abutment against each other during clamping, on the one hand, the dimensions of the frame are determined accurately and, on the other hand, the section pieces are joined at the corners without any overspill of material on that surface of the frame that is exposed to view. This makes it possible to avoid deburring the corners.

In FIG. 2b, the inside of the section pieces 1 is welded after 3 mm of material has melted. The lateral sides 14 and 15 having acted as limit stops during welding are not themselves welded but are simply in contact with their adjacent counterparts.

The assembly is sealed in this instance also, by virtue of the fact that the interior walls 8 are welded together, creating a continuous moisture barrier inside the frame.

A As an alternative to the embodiment depicted in FIGS. 2a and 2b, the inner wall 8 on the side 14 bearing the mobile glazing bead 4 could be extended over the entire height of the main section piece 2 so as to entirely line the outer wall 9.

In another alternative form, an additional inner wall specially dedicated to sealing the frame could extend a short distance from the outer wall 9 on the side 14 bearing the mobile glazing bead 4, and line the outer wall 9.

Figure 3:
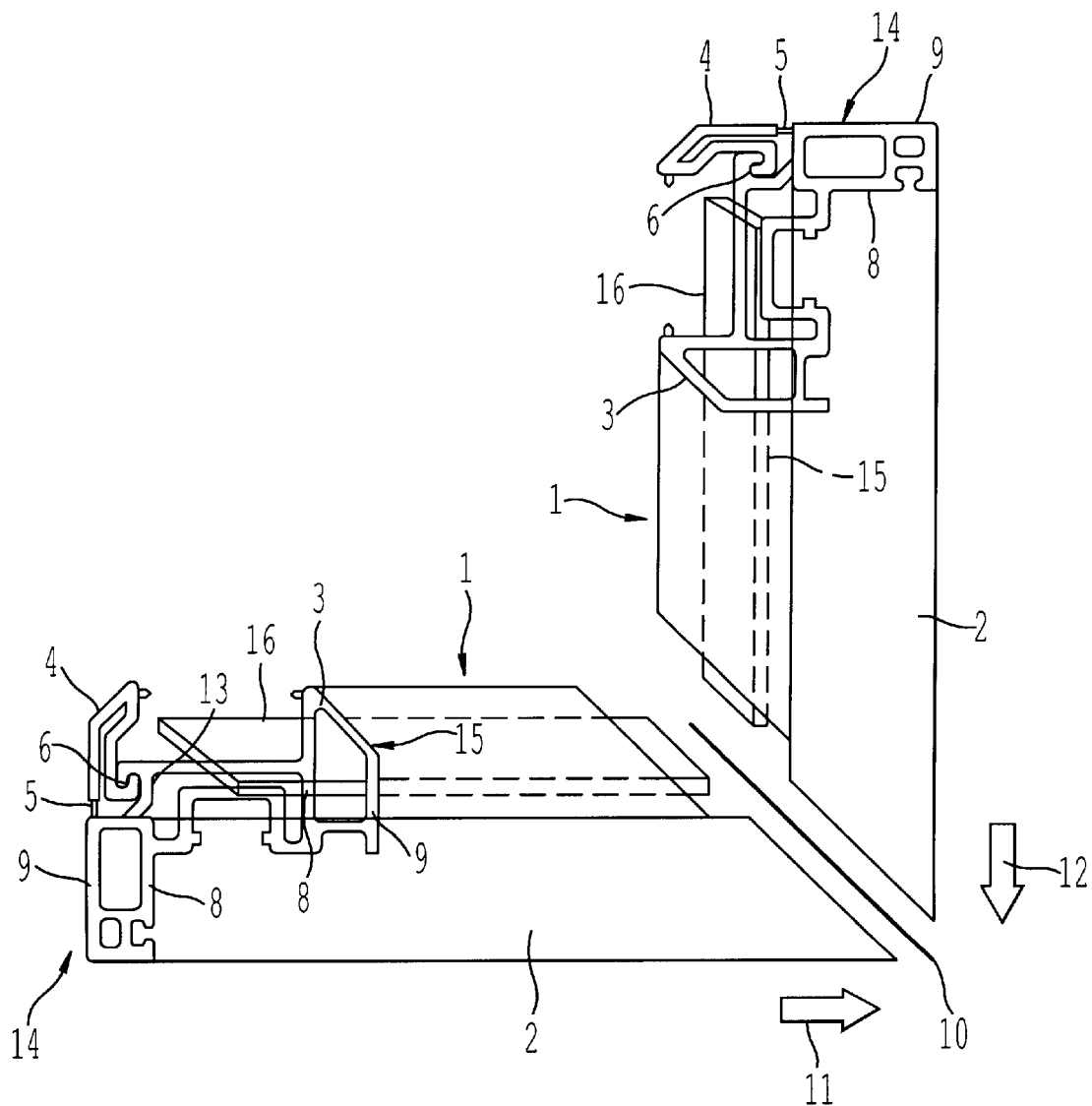
FIG. 3 is a view similar to FIG. 1, but showing casement bolts.

As shown in FIG. 3, according to a variant of the invention, a metal piece incorporated into the section pieces constituting the window frame is a casement bolt 1b.

What is claimed is:

1. A window frame comprising:
   a plurality of plastic section pieces, each of said plastic section pieces comprising a main section piece and at least one glazing bead,
   wherein said plurality of plastic section pieces are welded together at said main section pieces, and are not welded together at abutting surfaces of said glazing beads, and
   wherein when said main section pieces are in an unwelded state, said glazing beads are offset to be shorter than said main section pieces, and when said main section pieces are in a welded state, said glazing beads abut one another to determine the dimensions of the window frame.

2. The window frame of claim 1, wherein each of said plastic section pieces comprises a main section piece and glazing beads, and wherein said abutting surfaces comprise ends of said glazing beads.

3. The window frame of claim 1, wherein each of said plastic section pieces has a double wall at least in a region of an end thereof, said double wall comprising spaced apart inner and outer walls, and wherein the unwelded abutting surfaces are end surfaces of the outer walls of two of said plastic section pieces.

4. The window frame of claim 1, wherein each of said plastic section pieces comprises a main section piece and glazing beads, wherein one of said glazing beads is movably mounted to said main section piece, and wherein the unwelded abutting surfaces are end surfaces of the one of said glazing beads of adjacent plastic section pieces.

5. The window frame of claim 1, including seals at the unwelded abutting surfaces.

6. The window frame of claim 5, wherein ends of the seals are bonded.

7. The window frame of claim 1, further comprising an additional plastic section piece having the same length as said plurality of plastic section pieces welded together, wherein said additional plastic section piece is not welded to said plurality of plastic section pieces welded together.

8. The window frame of claim 1, further comprising a metal section piece incorporated into said plastic section pieces, said metal section piece having the same length as said plurality of plastic section pieces welded together.

9. The window frame of claim 8, wherein said metal section piece is a casement bolt.

* * * * *